United States Patent
Melzer et al.

(10) Patent No.: US 7,344,607 B2
(45) Date of Patent: Mar. 18, 2008

(54) NON-CHROMATE CONVERSION COATING TREATMENT FOR METALS

(75) Inventors: Jeffrey I. Melzer, Lansdale, PA (US); Andrea Keys, Yardley, PA (US); Michael T. Raab, Langhorne, PA (US); Robert A. Gelman, Newark, DE (US)

(73) Assignee: GE Betz, Inc., Trevose, PA (US)

( * ) Notice: Subject to any disclaimer, the term of this patent is extended or adjusted under 35 U.S.C. 154(b) by 120 days.

(21) Appl. No.: 10/631,523

(22) Filed: Jul. 31, 2003

(65) Prior Publication Data

US 2004/0020565 A1 Feb. 5, 2004

Related U.S. Application Data

(60) Continuation-in-part of application No. 10/430,579, filed on May 6, 2003, now abandoned, which is a continuation-in-part of application No. 10/341,164, filed on Jan. 13, 2003, now abandoned, which is a division of application No. 09/613,529, filed on Jul. 10, 2000, now Pat. No. 6,586,520, which is a continuation-in-part of application No. 09/348,346, filed on Jul. 8, 1999, now abandoned.

(51) Int. Cl.
C23C 22/17 (2006.01)
C23C 22/36 (2006.01)
C23C 22/00 (2006.01)

(52) U.S. Cl. ............... 148/260; 148/243; 148/253; 148/257; 148/259; 148/274; 106/14.12; 106/14.15; 106/14.16; 106/14.41; 106/14.42; 106/14.44

(58) Field of Classification Search ............. 148/246, 148/257, 251; 204/181.1; 427/409; 524/514
See application file for complete search history.

(56) References Cited

U.S. PATENT DOCUMENTS

| | | | |
|---|---|---|---|
| 2,926,116 A | 2/1960 | Keim | |
| 2,926,154 A | 2/1960 | Keim | |
| 4,416,729 A | 11/1983 | Killat et al. | |
| 4,673,702 A | 6/1987 | Iacoviello | |
| 4,859,527 A | 8/1989 | DiStefano | |
| 4,962,141 A | 10/1990 | Iacoviello et al. | |
| 5,120,259 A | 6/1992 | Nakata et al. | |
| 5,282,905 A | 2/1994 | Reichgott et al. | |
| 5,344,505 A | 9/1994 | Ouyang et al. | |
| 5,385,655 A * | 1/1995 | Brent et al. | 204/488 |
| 5,389,405 A * | 2/1995 | Purnell et al. | 427/387 |
| 5,614,597 A | 3/1997 | Bower | |
| 5,644,021 A | 7/1997 | Maslanka | |
| 5,668,246 A | 9/1997 | Maslanka | |
| 5,716,603 A | 2/1998 | Chen et al. | |
| 5,972,433 A * | 10/1999 | Chen et al. | 427/386 |
| 6,197,880 B1 | 3/2001 | Nigam | |
| 6,203,854 B1 | 3/2001 | Affinito | |
| 6,248,182 B1 * | 6/2001 | Ding et al. | 148/251 |
| 6,291,020 B1 * | 9/2001 | Melzer et al. | 427/387 |
| 6,586,520 B1 * | 7/2003 | Canorro et al. | 524/514 |

FOREIGN PATENT DOCUMENTS

WO WO 01/04224 A1 1/2001

OTHER PUBLICATIONS

National Coil Coaters Association, Technical Bulletin 4.2.9, NCCA No. II-Sep. 23, 1984, Revision 1—Jun. 1996—Test Method for Evaluation of Adhesion and Flexibility by the Draw Method.
Material Safety Data Sheet, Jul. 9, 1997.
Union Carbide Corporation, Material Safety Data Sheet, Sep. 15, 1999.
OSI Specialities, Material Safety Data Sheet, Dec. 5, 2000.

* cited by examiner

*Primary Examiner*—Roy King
*Assistant Examiner*—Lois Zheng
(74) *Attorney, Agent, or Firm*—Wegman, Hessler & Vanderburg

(57) ABSTRACT

Chromate-free treatments and compositions, for applying a conversion or passivation coating to zinc coated metal surfaces. The compositions comprise a polyamidoamine/epihalohydrin polymer or cationic polyamine/epihalohydrin polymer component, fluoacid, $H_3PO_4$, and a film forming polymer latex component. The requisite metal surfaces are contacted by the compositions and dried. Rinsing is optional.

19 Claims, No Drawings

NON-CHROMATE CONVERSION COATING TREATMENT FOR METALS

CROSS-REFERENCE TO RELATION APPLICATIONS

The present application in a continuation in part application of U.S. Ser. No. 10/430,579 filed May 6, 2003, now abandoned, which in turn was a continuation in part of U.S. Ser. No. 10/341,164, filed Jan. 13, 2003, now abandoned, which in turn was a divisional of U.S. Ser. No. 09/613,529 filed Jul. 10, 2000, now U.S. Pat. No. 6,586,520, which in turn was a continuation in part of U.S. application Ser. No. 09/348,346, filed Jul. 8, 1999, now abandoned. The disclosures of all of the prior filed applications set forth above are incorporated by reference herein.

FIELD OF THE INVENTION

The present invention relates to non-chromate coatings for metals. More particularly, the present invention relates to non-chromate coatings for zinc coated metal surfaces to improve corrosion resistance and adhesion of paints to the surface. The invention provides a dried in place coating which is particularly effective at treating galvanized steel coil strip.

BACKGROUND

The purposes of the formation of a chromate conversion coating on the surface of galvanized steel are to provide corrosion resistance, improve adhesion of coatings and for aesthetic reasons. Chromate passivation of a galvanized steel surface is done to provide corrosion resistance and for aesthetic reasons on materials which are not to be painted. The conversion coating improves adhesion of coating layers such as paints, inks, lacquers and plastic coatings. Galvanized steel is typically treated with an aqueous composition containing hexavalent or trivalent chromium ions with other additives to create a chromium conversion coating.

Growing concerns exist regarding the pollution effects of chromates discharged into rivers and waterways by such processes. Because of the high solubility and the strongly oxidizing character of hexavalent chromium ions, conventional chromate conversion processes require extensive waste treatment procedures to control their discharge. In addition, the disposal of the solid sludge from such waste treatment procedures is a significant problem.

Accordingly, there is a need in the art to provide an effective nonchromate treatment to provide a dried in place conversion or passivation coating to inhibit metal surface corrosion and enhance adhesion of paint on other coatings that may be applied to the metal surface.

SUMMARY OF THE INVENTION

The present invention provides a method of treating the surface of galvanized metals, such as steel, to provide for the formation of a coating which increases the corrosion resistance and adhesion properties of the galvanized steel surface. The passivation or conversion coating formed by the present invention may be dried in place or rinsed. The methods of the invention comprise contacting a galvanized metal surface with an aqueous treatment composition comprising a polyamidoamine/epihalohydrin resin, or cationic polyamine/epihalohydrin polymer and a fluoacid of a Group IVB metal. Additionally, the composition may comprise phosphoric acid and an aminosilane compound. The aqueous treatment composition may also include a latex polymeric film forming component.

Other objects and advantages of the invention will be apparent from the following description and the appended claims.

DETAILED DESCRIPTION

The inventors have found that an improved, non-chromate conversion or passivation coating can be provided on galvanized metal surfaces, such as hot dipped galvanized steel surfaces, by contacting the desired surface with a relatively dilute aqueous coating solution or dispersion of:

(1) a polyamidoamine/epihalohydrin resin or cationic polyamine/epihalohydrin adduct; and
(2) a fluoacid.

A latex, film forming polymer (3), phosphoric acid (4), and an aminosilane component (5) may also be present.

Compositions of the invention have been found to provide an aqueous pretreatment agent for the treatment of galvanized metal surfaces which provides improved corrosion resistance and adhesion of latex applied coatings when the treatment is dried in place.

The polyamidoamine/epihalophydrin or cationic polyamine epihalohydrin resin component are commercially available. These are described for example in U.S. Pat. Nos. 2,926,116, 2,926,154, and 5,614,597. Preferred polyamidoamines are the ammonium polyamidoamines with crosslinkable polyazetidinium polymers being especially preferred. Ammonium polyamidoamines may be prepared in accord with the techniques set forth in U.S. Pat. No. 4,416,729 that involve reacting a polyamidoamine with an α, β ethylenically unsaturated carboxylic acid to form a substituted polyamidoamine followed by contacting the substituted polyamidoamine with a polyamine having secondary and/or primary amine moieties under conditions sufficient to form a branched polyamidoamine having a pendant amine moiety. The branched polyamidoamine is then treated with an epihalohydrin under conditions sufficient to form pendant curable ammonium moieties on the branched polyamidoamine.

Of the ammonium polyamidoamines, the most preferred are the azetidium polymers. These polymers are comprised of monomeric repeat units containing a substituted or unsubstituted azetedine ring (i.e., a four-membered nitrogen containing heterocycle).

Polymers of this type are commercially available in water based formulations. An exemplary product is KYMENE 557H available from Hercules Inc., Wilmington, Del. which is sold in the form of a 12.5% aqueous solution.

Additionally, the compositions of the invention may include as the resin or polymer component a cationic polyamine/epihalohydrin adduct such as those sold under the trademark KYMENE 736 available from Hercules. This is commercially available in the form of a 38 wt % actives basis solution or dispersion and is presently preferred. It is as an alkylenediamine epihalohydrin copolymer, specifically a hexamethylenediamine/epichlorohydrin copolymer described in U.S. Pat. Nos. 3,655,506; 3,248,353; and 2,595,935.

As to the film forming latex polymer material, this can be chosen from a wide variety of materials such as styrene—butadiene copolymers, acrylate resins, polyvinylacetate and similar materials. Some commercially available latex materials include:

| Description | Type |
|---|---|
| "Neocar" (Union Carbide) | Vinyl Ester/Acrylic |
| "Res 3077" (Rohm & Haas) | Vinyl Acetate/Acrylic |
| "Airflex" 500 (Air Products) | Vinyl Acetate/Ethylene |

-continued

| Description | Type |
|---|---|
| "Airflex 4514 (Air Products) | Vinyl Chloride/Amide Terpolymer |
| Airflex 4500 (Air Products) | Vinyl Chloride/Amide Terpolymer |
| Flexhane 620 (Air Products) | Urethane |
| Vinac 884 (Air Products) | Vinyl Acetate |
| Dow 620 (Dow) | SBR |
| Airflex 4530 (Air Products) | polyamidoamine/EPI and ethylene vinyl chloride |

Surfactants, plasticizers and coalescing agents may be added as needed to make the latex suspension. In the preferred mode, the Kymene 557H product is added to the commercially available Airflex 4530 product and additional DI water added to make the latex emulsion.

As to the fluoacid that is present in the treatment formulation, this is a water soluble fluoacid of a Group IVB metal or mixtures thereof. Fluozirconic acid, $H_2ZrF_6$ is presently preferred although $H_2TiF_6$ can also be mentioned as exemplary. Combinations of these acids may also be used.

As stated above, phosphoric acid, $H_3PO_4$, and salts thereof are also an optional component. The phrase "phosphoric acid" used herein, refers to both the acid and salt form.

Aminosilane compounds may also be present in the aqueous treatment composition. It is desirable to use gamma-aminopropylsilane (γ-APS) due to its efficacy and commercial availability. However, other alkoxylated aminoalkylsilanes such as aminopropyltrimethoxy silane, etc., can also be mentioned. U.S. Pat. No. 6,203,854 can be reviewed for a more complete listing of the alkoxylated aminoalkylsilanes.

Normally, the latex and the polyamidoamine/epihalohydrin or cationic polyamine/epihalohydrin resin are purchased from commercial suppliers in aqueous solution or dispersion form. The products are mixed and the fluoacid, phosphoric acid, and aminosilane are then added thereto and gently mixed. The pH of the treatment compositions are generally on the order of from about 2 to about 6.

Dilute dispersions of the treatment are made and comprise, on an actives basis:

0.01 to 80 wt % polyamidoamine/epihalohydrin resin or cationic polyamine/epihalohydrin resin
0.01 to 30 wt % latex film forming polymer
0.01 to 30 wt % fluoacid
0.01 to 30 wt % $H_3PO_4$
0.05 to 10 wt % aminosilane
remainder water (to add up to 100%).

Even more preferred are compositions having the following ranges (by weight) of components.

0.01 to 30 wt % polyamidoamine/epihalohydrin resin or cationic polyamine/epihalohydrin resin
0.01 to 25 wt % latex film forming polymer
0.01 to 10 wt % fluoacid
0.01 to 10 wt % $H_3PO_4$
0.05 to 10 wt % aminosilane
remainder water (to add up to 100%).

The requisite metal surface such as Al or steel may be contacted by the treatment in spray, immersion, or roller applications. The treatment is then dried and the metal surface is ready for painting or other coating application.

The conversion or passivation treatment of the present invention is applied to result in a conversion coating weight of greater than about 1 milligram per square foot of treated surface with a weight of about 2 to 50 milligrams per square foot being more preferred.

At present, the treatment formulation preferred for use is:

| | wt % |
|---|---|
| cationic amine polymer/epichlorohydrin adduct (Kymene 736) | 15.28 |
| vinyl ester/acrylic latex (Neocar 2535) | 8.56 |
| γ APS - aminosilane | 1.00 |
| Fluozirconic acid | 1.71 |
| Fluotitanic acid | 2.28 |
| Phosphoric acid | 6.37 |
| water (to add up to 100%) | remainder |

For use in commercial applications, working solutions comprising from 3-100, preferably 10-100 wt % concentrations of the above preferred formulation are used to contact the desired metal surfaces.

EXAMPLES

The invention will now be described in conjunction with the following examples which are to be regarded as being illustrative of certain embodiments of the invention but should not be viewed to restrict the scope of the invention.

Example 1

Treatment Formulations

One tested treatment candidate Formulation "A" was a latex emulsion including the following components: a) 75 wt % polyamidoamine/epihalohydrin resin—KYMENE 557H—Hercules Inc.—(12.5% active component); b) 11.1 wt % Airflex 4530 ethylene vinyl chloride emulsion; (about 50% active component); and c) remainder demineralized water. To this basic treatment, varying amounts of phosphoric acid and fluoacid were added as indicated.

Process Sequence

Test panels for the examples were prepared as follows: G70/70 hot dipped galvanized steel test panels purchased from ACT Laboratories were spray cleaned with a 3% aqueous solution of an alkaline surfactant product and then rinsed with DI water and subsequently coated with the test treatment formulations by spin coat application, followed by forced air drying. The treated panels were then painted with a black single coat polyester paint. The painted panels were oven dried at a temperature of 650° F. reaching a peak metal temperature of 450° F. at about 58 seconds. The dry film thickness of the painted panels was about 0.7-0.8 mil. with a pencil hardness of 3H and MEK double rub of 100+.

The following treatment formulations were obtained and tested. Permatreate® 1500 is a chrome no rinse pretreatment commercially available from GE Betz.

| Sample | Description |
|---|---|
| 1 | 6.8 wt % "A"; 1.0 wt % $H_2ZrF_6$ (45% Actives); remainder water |
| 2 | 6.8 wt % "A"; 1.0 wt % $H_2ZrF_6$ (45% Actives); 1.0 wt % phosphoric acid; remainder water |
| 3 | 6.8 wt % "A"; 1.0 wt % $H_2ZrF_6$ (45% Actives); 2.0 wt % phosphoric acid; remainder water |
| 4 | 6.8 wt % "A"; 1.0 wt % $H_2ZrF_6$ (45% Actives); 3.0 wt % phosphoric acid; remainder water |
| 5 | 2.0 wt % phosphoric acid, 1.0 wt % $H_2ZrF_6$ (45% Actives); remainder water |
| 6 | 10 wt % Permatreat ® 1500 |
| 7 | 15 wt % non-chrome treatment state of the art |

The painted and treated test panels were then tested in accordance with the following test procedures:

A. Cross Hatch—describes the tendency to disadhere from areas between closely spaced lines through the paint. This test was done according to ASTM D3359 (from a 0B to 5B scale, wherein 5B is perfect).
B. T-Bend—describes the tendency for paint to disadhere from a 180° bend in the metal measured according to ASTM D4145-83 (wherein 0T is perfect).
C. Reverse Impact—describes the tendency of paint to disadhere from metal deformed by an impact of known momentum on the reverse side of the test surface according to ASTM D2794.
D. MEK rub—describes whether the paint is cured properly in accordance with National Coil Coaters' Association (NCCA) Method II-18.
E. NSS—Neutral Salt Spray test per ASTM B-117 and rated according to ASTM D-1654 (10=perfect).

Results are shown in Tables 1 and 2

TABLE 1

Physical Testing Data

| Sample | Cross-Hatch Test (ASTM D3359) | T-Bend Test (ASTM D4145-83) | Reverse Impact Test (in/lb, ASTM D2794) | MEK rubs (NCCA 11-18) |
|---|---|---|---|---|
| 1 | 5B | 0T | 160 | 100+ |
| 2 | 5B | 0T | 160 | 100+ |
| 3 | 5B | 0T | 160 | 100+ |
| 4 | 5B | 4T | 160 | 100+ |
| 5 | 5B | 0T | 160 | 100+ |
| 6 | 5B | 0T | 160 | 100+ |
| 7 | 5B | 0T | 160 | 100+ |

TABLE 2

Neutral Salt Spray Data, panels rated as per ASTM D1654 (10 = perfect).

| Sample | 72 hr. Scribe | 72 hr. Field | 168 hr. Scribe | 168 hr. Field | 240 hr. Scribe | 240 hr. Field | 336 hr. Scribe | 336 hr. Field | 500 hr. Scribe | 500 hr. Field |
|---|---|---|---|---|---|---|---|---|---|---|
| 1 | 7 | 8 | 5 | 8 | 4 | 7 | 4 | 7 | 1 | — |
| 2 | 9 | 8 | 6 | 8 | 7 | 8 | 5 | 6 | 6 | 4 |
| 3 | 9 | 9 | 9 | 9 | 8 | 9 | 8 | 9 | 8 | 9 |
| 4 | 9 | 9 | 9 | 9 | 8 | 9 | 8 | 8 | 7 | 8 |
| 5 | 9 | 9 | 9 | 9 | 8 | 9 | 7 | 9 | 7 | 9 |
| 6 | 9 | 9 | 9 | 9 | 8 | 9 | 8 | 8 | 7 | 8 |
| 7 | 8 | 8 | 7 | 7 | 6 | 8 | 5 | 8 | 4 | 6 |

Example 2

Formulation "A" as per Example 1 was modified by substitution of Union Carbide's Neocar 2535 vinyl/ester acrylate as the latex component. The resulting test formulation is referred to as "B" hereinafter.

Formulations and efficacy (Table 3) results of the various treatments are as follows:

| Sample | Description |
|---|---|
| 8 | 6.8 wt % "B", 1.0 wt % $H_2ZrF_6$ (45% actives); 2.0 wt % phosphoric acid pH = 2.44 |
| 9 | 10.0 wt % Permatreat ® 1500 |
| 10 | 15.0 wt % non-chrome treatment; state of the art |

TABLE 3

| Sample | T-Bend Test (ASTM D4145-83) | Reverse Impact Test (in/lb, ASTM D2794) | Cross-Hatch Test (ASTM D3359) | MEK rubs (NCCA 11-18) | 240 Hours Neutral Salt Spray (ASTM D1654)* | 500 Hours Neutral Salt Spray (ASTM D1654)* |
|---|---|---|---|---|---|---|
| 8 | 1T | 160 | 5B | 100+ | 9/8, 9/9 | 8/9, 9/9 |
| 9 | 0T | 160 | 5B | 100+ | 10/9, 10/9 | 9/9, 9/9 |
| 10 | 1T | 160 | 5B | 100+ | 5/8, 5/8 | 3/4, 3/6 |

*Ratings are scribe/field for the NSS results, 10 = perfect

The results in Table 2 demonstrate results comparable to a chrome no-rinse (Sample 9).

Example 3

Another new non-chrome pretreatment as described below had the following concentrate formulation and was used at various dilutions to treat the metal surface. The dilutions listed below are for lab purposes and should be higher for actual field use (in the range of 10-100% of concentrate).

| Formulation "C" | wt % |
| --- | --- |
| polyamide - epihloro resins | 13.4 - (Kymene 557H - Hercules - 12.5% actives) |
| vinyl ester/acrylate latex | 5.7 (Union Carbide - Neocar 2535 - 53% actives) |
| deionized water | 63.8 |
| APS | 1.0 - (gamma-Aminopropyltriethoxysilane) |
| 45% Fluozirconic acid | 3.8 |
| 60% Fluotitanic acid | 3.8 |
| 75% Phosphoric acid | 8.5 |

Formulations and efficacy (Tables 4 and 5) are as follows:

| Sample | Description |
| --- | --- |
| 11 | 5.0% v/v C |
| 12 | 7.0% v/v C |
| 13 | 10.0% v/v C |
| 14 | 12.0% v/v C |
| 15 | 15.0% v/v C |
| 16 | 10.0% v/v Permatreat ® 1500 |

TABLE 4

Physical Testing Data

| Sample | Cross-Hatch Test (ASTM D3359) | T-Bend Test (ASTM D4145-83) | Pencil Hardness Test (ASTM D3363-92a) | MEK rubs (NCCA 11-18) |
| --- | --- | --- | --- | --- |
| 11 | 5B | 0T | H | 100+ |
| 12 | 5B | 0T | H | 100+ |
| 13 | 5B | 0T | H | 100+ |
| 14 | 5B | 0T | F | 100+ |
| 15 | 5B | 0T | H | 100+ |
| 16 | 5B | 0T | H | 100+ |

TABLE 5

Neutral Salt Spray Data, panels rated as per ASTM D1654 (10 = perfect).

| | | 240 hr. | | 500 hr. | |
| --- | --- | --- | --- | --- | --- |
| Sample | Description | Scribe | Field | Scribe | Field |
| 11 | 5.0% v/v C | 6 | 10 | 5 | 9 |
| 12 | 7.0% v/v C | 7 | 10 | 5 | 10 |
| 13 | 10.0% v/v C | 7 | 10 | 6 | 9 |
| 14 | 12.0% v/v C | 7 | 9 | 5 | 10 |
| 15 | 15.0% v/v C | 7 | 10 | 6 | 9 |
| 16 | 10.0% v/v Permatreat ® 1500 | 8 | 10 | 5 | 9 |

The data in Table 5 demonstrate results comparable to a chrome no-rinse treatment Sample 16).

Example 4

The treatment described below has the following concentrate formulation and was used at various dilutions to treat the metal surface.

| Formulation D | Wt % |
| --- | --- |
| polyamidoamine/epihalohydrin resin | 2.25 (Kymene 557H Hercules) |
| 60% fluotitanic acid | 7.50 |
| deionized water | 90.25 |

Formulations and efficacy (Table 6) are as follows:

| Sample | Description |
| --- | --- |
| 17 | 15.0% v/v D |
| 18 | 10.0% v/v non-chrome treatment; state of the art |
| 19 | 15.0% v/v non-chrome treatment; state of the art |
| 20 | 10.0% v/v Permatreat ® 1500 |

TABLE 6

Tinius-Olsen cup data, domes rated as per ASTM D2794-93 (10 = perfect)

| Sample | Tinius-Olsen Cup Test |
| --- | --- |
| 17 | 10 |
| 18 | 4 L |
| 19 | 5 L |
| 20 | 10 |

The apparatus used for this test was a Tinius-Olsen testing machine with a ⅞-inch (22 mm) diameter ball and 1-inch (25 mm) diameter die. Scotch #610 adhesive tape or equivalent was used, and test specimens were cut samples of 2¾ in width. Procedure and Evaluation were as follows:

Procedure

Performed the test at 77±2° F. (25±1° C.). Test specimens should be equilibrated at the same temperature before the test.

Insert the test specimen in the side slot of the Tinius-Olsen machine with the coating of interest facing up. Rotate the top handle clockwise to secure the test specimen. Position the dial micrometer in the viewing hole and adjust to zero.

Gradually rotate the wheel on the side of the machine in the clockwise direction until either the desired deformation has been reached or the metal fractures. Rotate the wheel in the counterclockwise direction to retract the forming ball, then rotate the handle on top to release the sample. Remove loose coating from the deformed area using Scotch #610 tape.

Evaluation

Compare the amount of coating removed from the formed, taped specimen with the photographic standard. Rate on a scale of one to eight as shown on the standard. The coating removed from a galvanized steel panel should be checked for zinc. The zinc coating will occasionally flake from the steel substrate under extreme deformation.

Film surface lubricity may affect the adhesion of the tape and therefore may affect how much coating is removed from the deformed area.

Example 5

Formulations E and F were prepared as follows.

| E | |
|---|---|
| cationic amine polymer/epichlorohydrin adduct (a) | 15.28 |
| vinyl ester/acrylic latex (b) | 8.56 |
| γ APS - aminosilane | 1.00 |
| Fluozirconic acid | 1.71 |
| Fluotitanic acid | 2.28 |
| Phosphoric acid | 6.37 |
| Water | remainder |

| F | |
|---|---|
| cationic amine polymer/epichlorohydrin adduct (a) | 7.64 |
| vinylester/acrylic latex (b) | 4.56 |
| γ APS - aminosilane | 1.00 |
| Fluozirconic acid | 1.71 |
| Fluotitanic acid | 2.28 |
| Phosphoric acid | 6.37 |
| Water | remainder |

(a) = Kymene 736
(b) = Neocar 2535

Process Sequence

The Formulations E and F were used at various dilutions to treat the metal surface. This was an unpainted application, so the treatment was applied to the metal and tested. The dilutions listed below are for lab purposes and should be higher for actual field use (in the range of 10-100% of concentrate).

ACT Inc. hot dipped galvanized lab stock panels were processed in the following sequence:

| Clean | 3 Betz KL 132, 5 s spray, 20 psi, 130° F. |
|---|---|
| Rinse | tap water, 5 s |
| Dry | forced cold air, lab dryer |
| Treatment | spin applied |
| Cure | 150° F. peak metal temperature |

| Sample | Description |
|---|---|
| 21 | Solution B, 45% v/v |
| 22 | Solution F, 45% v/v |
| 23 | State of the Art Commercial Chrome Acrylic Passivation |

Results showing Neutral Salt Spray Data are shown in Table 7.

TABLE 7

Neutral Salt Spray Data
Panels rated as per ASTM D1654-92 (% White Rust, 0 = perfect)

| Sample | 96 hours NSS | 192 hours NSS |
|---|---|---|
| 21 | 2 | 2 |
| 22 | 2 | 5 |
| 23 | 0 | 5 |

It should be understood that the foregoing description of this invention is not intended to be limiting but is only exemplary of the inventive features which are defined in the claims.

What is claimed is:

1. A method of forming a conversion or passivation coating on a metal surface comprising contacting said metal surface with an acidic aqueous treatment composition having a pH of about 2 to about 6, said composition comprising: about 0.01 to 80 wt % of (a) (i) polyamidoamine/epihalohydrin resin or (ii) cationic polyamine/epihalohydrin copolymer, about 0.01-30 wt % (b) fluoacid of a Group IVB metal, about 0.01-30 wt % of (c) phosphoric acid, about 0.05-10 wt % of (d) an aminosilane compound and about 0.01-30 wt % of (e) a film forming latex.

2. A method as recited in claim 1 wherein said metal surface is a zinc coated metal surface.

3. A method as recited in claim 1 wherein said metal surface is galvanized steel.

4. A method as recited in claim 1 wherein said metal surface is aluminum.

5. The method as recited in claim 1 wherein said treatment composition is chromate free.

6. The method as recited in claim 1 wherein said fluoacid (b) is $H_2ZrF_6$.

7. The method as recited in claim 1 wherein said fluoacid (b) is H2TiF6.

8. Method as recited in claim 1 wherein (a) is present in an amount of 0.01-30 wt %; (b) is present in an amount of 0.01-10 wt %; (c) is present in an amount of 0.01-10 wt %; (d) is present in an amount of 0.05-10 wt % and (e) is present in an amount of 0.01-25 wt %.

9. A method as recited in claim 1 wherein said polyamidoamine/epihalohydrin resin is present and comprises a cross-linked polyazetidinium polymer.

10. The method as recited in claim 9 wherein said latex film forming component comprises a vinyl chloride or vinyl ester/acrylate.

11. A method as recited in claim 1 wherein said cationic polyamine/epihalohydrin copolymer is present.

12. The method as recited in claim 11 wherein said latex film forming component comprises a vinyl chloride or vinyl ester/acrylate.

13. A method of treating a galvanized metal surface to form a conversion or passivation coating of greater than 1 mg per square foot on said surface, said method comprising contacting said galvanized metal surface with an acidic aqueous treatment composition having a pH of about 2 to about 6, said treatment composition comprising a latex film forming component present in an amount of 0.01-30 wt %, a (i) polyamidoamine/epihalohydrin polymer or (ii) cationic polyamine/epihalohydrin polymer present in an amount of 0.01-80 wt %, fluoacid of a Group IVB metal present in an amount of 0.01-30 wt %, phosphoric acid, and aminosilane present in an amount of 0.05-10 wt %, said method comprising drying said metal surface after said contact thereof with said treatment composition.

14. Method as recited in claim 13 wherein said latex emulsion comprises vinyl chloride.

15. Method as recited in claim 13 wherein said latex comprises vinyl ester/acrylate.

16. Method as recited in claim 13 wherein polyamine/epihalohydrin polymer is present and wherein said latex component comprises vinyl ester/acrylate.

17. Method as recited in claim 13 wherein said polyamidoamine/epihalohydrin polymer is present and is a cross-linkable polyazetidinium polymer.

18. Method as recited in claim 13 wherein said cationic polyamine/epihalohydrin copolymer is present.

19. Method as recited in claim 13, said latex film forming component being present in an amount of 0.01-25 wt %, said (i) polyamidoamine/epihalohydrin polymer or (ii) cationic polyamine/epihalohydrin polymer being present in an amount of 0.10-30 wt %, said fluoacid being present in an amount of 0.01-10 wt %, said phosphoric acid being present in an amount of 0.1-10 wt % and said aminosilane being present in an amount of 0.05-10 wt %.

\* \* \* \* \*